(12) United States Patent
Lai et al.

(10) Patent No.: US 9,201,466 B2
(45) Date of Patent: Dec. 1, 2015

(54) PORTABLE COMPUTER

(71) Applicant: Wistron Corporation, New Taipei (TW)

(72) Inventors: Yen-Chang Lai, New Taipei (TW);
Shang-Mao Lee, New Taipei (TW);
Chun-Chien Chen, New Taipei (TW);
Hung-Chih Chen, New Taipei (TW)

(73) Assignee: Wistron Corporation, New Taipei (TW)

( * ) Notice: Subject to any disclaimer, the term of this patent is extended or adjusted under 35 U.S.C. 154(b) by 307 days.

(21) Appl. No.: 13/915,798

(22) Filed: Jun. 12, 2013

(65) Prior Publication Data

US 2014/0043749 A1 Feb. 13, 2014

(30) Foreign Application Priority Data

Aug. 13, 2012 (TW) .............................. 101129269 A (51) Int. Cl.
*G06F 1/16* (2006.01)

(52) U.S. Cl.
CPC .............. G06F 1/1681 (2013.01); G06F 1/162 (2013.01)

(58) Field of Classification Search
CPC ........................................................ G06F 1/16
USPC ............. 361/679.01–679.45, 679.55–679.61, 361/724–747, 752–759, 796–837; 312/223.2, 7.1, 319.9, 333, 348.3, 222, 312/226
See application file for complete search history.

(56) References Cited

U.S. PATENT DOCUMENTS

| | | | | |
|---|---|---|---|---|
| 4,960,256 A | * | 10/1990 | Chihara et al. | 248/286.1 |
| 5,085,394 A | * | 2/1992 | Torii | 248/455 |
| 5,168,426 A | * | 12/1992 | Hoving et al. | 361/679.09 |
| 5,209,448 A | * | 5/1993 | Hatanaka et al. | 248/455 |
| 5,666,694 A | * | 9/1997 | Slow et al. | 16/368 |
| 5,844,543 A | * | 12/1998 | Tamura et al. | 345/156 |
| 6,154,359 A | * | 11/2000 | Kamikakai et al. | 361/679.27 |
| 6,430,038 B1 | * | 8/2002 | Helot et al. | 361/679.05 |
| 6,654,230 B1 | * | 11/2003 | Jones et al. | 361/679.19 |
| 6,778,196 B2 | * | 8/2004 | Nakamura | 361/679.27 |
| 6,798,649 B1 | * | 9/2004 | Olodort et al. | 361/679.13 |
| 6,912,121 B2 | * | 6/2005 | Karidis et al. | 361/679.06 |

(Continued)

FOREIGN PATENT DOCUMENTS

| | | |
|---|---|---|
| CN | 1954282 A | 4/2007 |
| CN | 202285473 U | 6/2012 |

(Continued)

*Primary Examiner* — Courtney Smith
*Assistant Examiner* — Rashen E Morrison
(74) *Attorney, Agent, or Firm* — Muncy, Geissler, Olds & Lowe, P.C.

(57) ABSTRACT

A portable computer includes a base, a display module, a support element and a cam structure. The base comprises a first area and a second area. The display module includes a connecting end and a display face. The support element includes a first end connected pivotally to a portion of the display module other than the display face and a second end connected pivotally to the rear end of the base. Two ends of the cam structure are connected pivotally to the base and the support element. Accordingly, the support element is connected indirectly and pivotally to the base. When the display module is slid and rotated relative to the base to change a notebook state or a tablet state, the support element does not interfere the movement of the display module and keep the flatness of the whole appearance of the portable computer.

20 Claims, 10 Drawing Sheets

(56) References Cited

U.S. PATENT DOCUMENTS

| | | | |
|---|---|---|---|
| 6,947,279 B2 * | 9/2005 | Cheng et al. | 361/679.06 |
| 6,975,507 B2 * | 12/2005 | Wang et al. | 361/679.21 |
| 7,148,874 B2 * | 12/2006 | Anzai et al. | 345/156 |
| 7,184,263 B1 * | 2/2007 | Maskatia | 361/679.27 |
| 7,203,059 B1 * | 4/2007 | Kramer | 361/679.55 |
| 7,206,196 B2 * | 4/2007 | Ghosh et al. | 361/679.09 |
| 7,486,503 B1 * | 2/2009 | Wang et al. | 361/679.29 |
| 7,567,436 B2 * | 7/2009 | Jeong | 361/679.22 |
| 7,766,288 B2 * | 8/2010 | Kim et al. | 248/176.1 |
| 8,004,834 B2 * | 8/2011 | Shih et al. | 361/679.55 |
| 8,023,256 B2 * | 9/2011 | Walker et al. | 361/679.27 |
| 8,248,789 B2 * | 8/2012 | Wu et al. | 361/679.56 |
| 8,336,168 B2 * | 12/2012 | Huang et al. | 16/369 |
| 8,483,784 B2 * | 7/2013 | Griffin et al. | 455/575.3 |
| 8,537,542 B2 * | 9/2013 | Chen et al. | 361/679.55 |
| 8,605,430 B2 * | 12/2013 | Chen et al. | 361/679.55 |
| 2002/0145847 A1 * | 10/2002 | Crosby | 361/683 |
| 2006/0038795 A1 * | 2/2006 | Lee | 345/173 |
| 2007/0030634 A1 * | 2/2007 | Maskatia | 361/683 |
| 2008/0024975 A1 * | 1/2008 | Huang et al. | 361/686 |
| 2008/0174943 A1 * | 7/2008 | Hirasawa et al. | 361/681 |
| 2009/0000062 A1 * | 1/2009 | Yamanami | 16/366 |
| 2011/0148782 A1 * | 6/2011 | Wu et al. | 345/173 |
| 2012/0229962 A1 * | 9/2012 | Chen et al. | 361/679.01 |
| 2014/0043749 A1 * | 2/2014 | Lai et al. | 361/679.27 |

FOREIGN PATENT DOCUMENTS

| | | |
|---|---|---|
| TW | 566583 | 12/2003 |
| TW | 584227 | 4/2004 |

* cited by examiner

PORTABLE COMPUTER

BACKGROUND OF THE INVENTION

1. Field of the Invention

The present invention relates to a portable computer, and more particularly, to a portable computer which provides the display module with stable support and flat placed effect.

2. Description of the Related Art

Computing devices have become an indispensable part of our daily life. With the fast development of touch technologies, most hand-held devices or electronic devices such as tablet PC, smart phone, and PDA now provide touch panels instead of mouse or keyboard as input devices, these devices are equipped with operating system supporting touch functions to enable intuitive and convenient operations.

As notebook PCs are usually equipped with QWERTY keyboards and touch pads for input functions and they also use operating system which does not support touch functions or interfaces which cannot recognize touch gestures, so few notebook PCs provide touch functions or designs in the past. However, as software vendors are rolling out new operating system which can support touch functions and people are becoming familiar with touch gestures required to operate tablet PCs or smart phones, it is now necessary for manufactures to provide touch functions on notebook PCs or even transform their notebook PCs into tablet PCs. Due to a certain weight of the display, when a user opens the display to a suitable angle relative to the base for touch operations, the display is kept in a fixed position by a reactive torsion of a pivot bearing between the display and the base; however, when the user touches the display, a torque generated by the applied force and the distance between the point of applied force and the pivot bearing would cause the display to vibrate back and forth, making it inconvenient for the user to perform any touch function and hard to see the display clearly. Furthermore, when the user applies too much force on the display, the display could topple and fall backwards without proper support, the display could be damaged to discourage the user to perform any touch function.

Therefore, a prior art technique discloses a support arm for supporting and pivotally connecting to the display.

In prior art technique such as Taiwan patent No. 1316666 (U.S. Pat. No. 7,184,263B1), a portable computer uses a sheet-like support element to support a display and to let the display slide relative to the computer body via guide grooves on both sides of the keyboard to stand upright. However, this design can only apply for tablet PCs which have their displays faced upwards in a normal state and is not suitable for notebook PCs which usually have their displays faced down and towards a keyboard when not in use.

Furthermore, if it is needed to flip the display at 180 degrees, this support element is easy to interfere the flipped operation of the display in structural so that the flipped operation may not be completed smoothly or the flat state of the display on the computer body is affected.

Therefore, it is necessary to provide a structure of the portable computer which can smoothly rotate the display at 180 degrees to present different operation states and to provide a stable support and flat effect of the display.

SUMMARY OF THE INVENTION

It is an object of the present invention to provide a portable computer which can provide the display module with stable support and flat placed effect.

To achieve the above object, a portable computer includes a base, a display module, a support element and a cam structure. The base comprises a front end and a rear end. A front side and a rear side are between the front end and a rear end, and a first area is defined at the front side and a second area is defined at the rear side. The display module includes a connecting end, a free end relative to the connecting end, a display face, and a support plane relative to the display face. Each support element includes a first fixed end and a second fixed end, and the first fixed end is connected pivotally to a portion of the display module other than the display face so that the display module is able to rotate relative to the support element. The cam structure includes a first connecting portion and a second connecting portion; the first connecting portion is connected pivotally to the second fixed end so that the support element is able to rotate relative to the cam structure; the second connecting portion is connected pivotally to the rear end of the base or close to the rear end so that the cam structure is able to rotate relative to the base. Accordingly, the support element is connected indirectly and pivotally to the base. When the display module is slid and rotated relative to the base to change a notebook mode or a tablet mode, the support element will not interfere the movement of the display module and keep the flatness of the whole appearance of the portable computer.

In an embodiment of the present invention, the portable computer further comprises at least one first pivot element, and the base and the second connecting portion of the cam structure are pivotally connected to each other by each first pivot element; wherein each first pivot element includes a torsion spring for providing torque assisting the potential energy of the first connecting portion of the cam structure rotating towards the bottom of the based at the second connecting portion as a fulcrum.

In an embodiment of the present invention, the rear end of the base or a position closed to the rear end of the base further includes an recess portion for receiving the cam structure.

In an embodiment of the present invention, the portable computer further includes at least one sliding assembly, and each sliding assembly including a sliding element and a sliding guide structure; the sliding guide structure is disposed at least in the second area of the base; the sliding element is combined with the connecting end of the display module and slides along the sliding guide structure.

In an embodiment of the present invention, the display module further comprises two auxiliary sliding elements, symmetrically disposed at two sides of the connecting end; the base further includes two auxiliary sliding structures corresponding to the two auxiliary sliding elements, symmetrically disposed at two sides of the input module.

Through the portable computer of the present invention, the pivotal design of the support element working with the cam structure provides a automatic positioning and a stable support when the display module flips relative to the base. Whether the display face or the support plane faces the base, in the abovementioned two states and during the flip process of the display module, the support element does not be interfered but smoothly flips or overlaps on the base, so as to provide users with a better operation effect.

DETAILED DESCRIPTION OF THE PREFERRED EMBODIMENT

The advantages and innovative features of the invention will become more apparent from the following detailed description of the better embodiments when taken in conjunction with the accompanying drawings.

Figure 1:
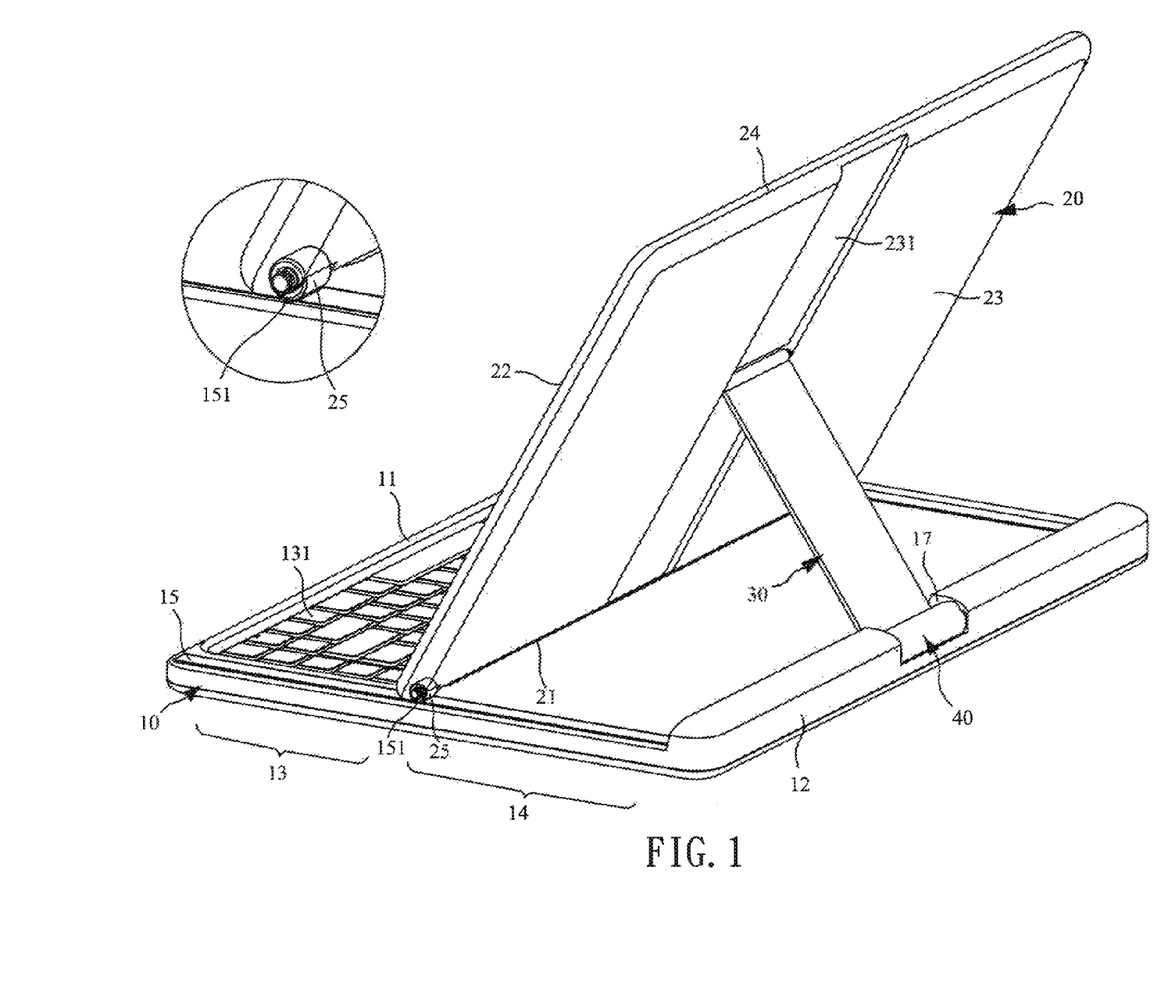
FIG. 1 illustrates a schematic diagram of a first embodiment of a portable computer of the present invention.
Figure 2:
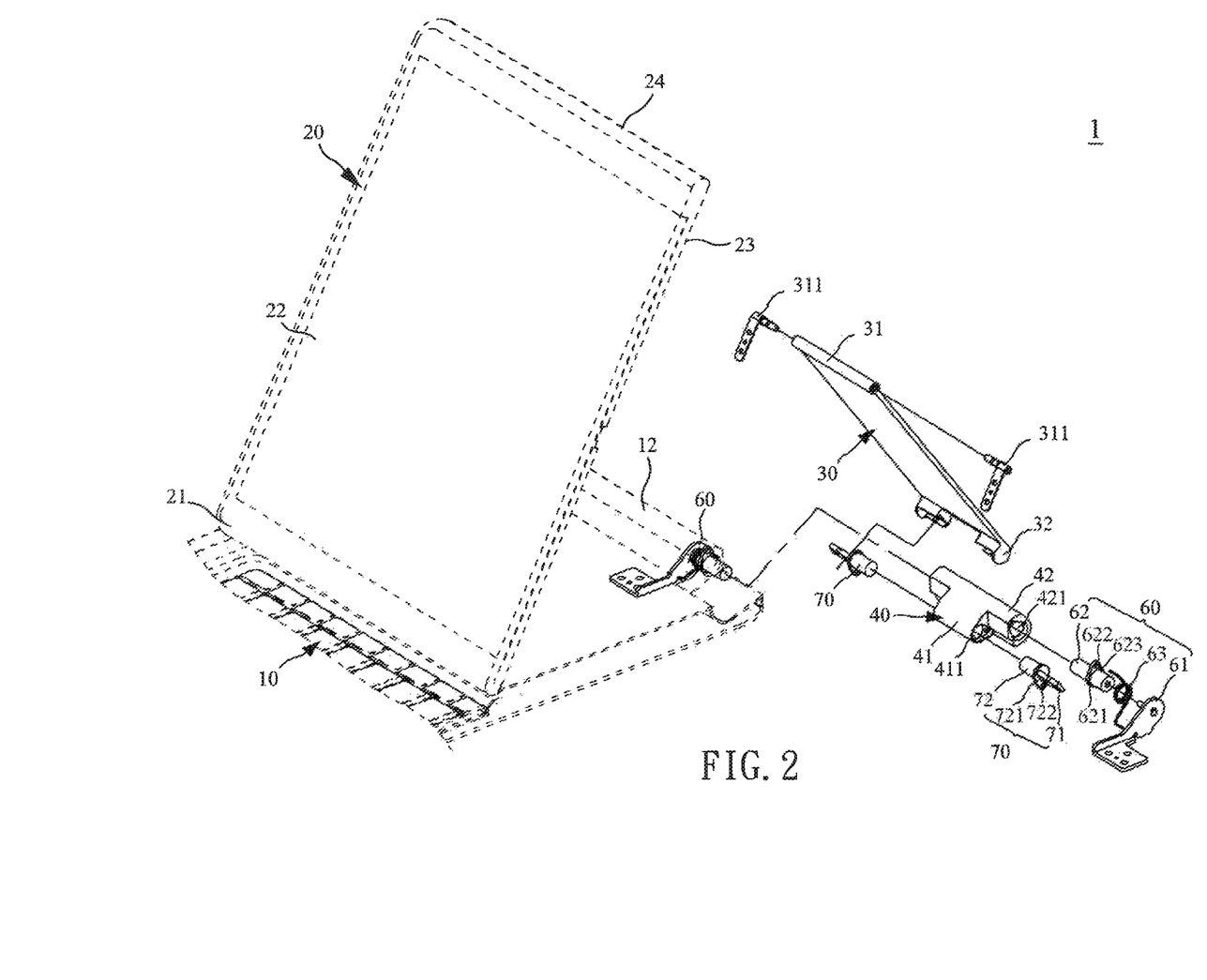
FIG. 2 illustrates a partial explosive diagram of the first embodiment of the portable computer of the present invention.

Please refer to FIG. 1 and FIG. 2. FIG. 1 illustrates a schematic diagram of the first embodiment of the portable computer 1 of the present invention. FIG. 2 illustrates a partial explosive diagram of the first embodiment of the portable computer 1 of the present invention. In an embodiment of this invention, the portable computer 1 is a notebook, but based on different types of application, the portable computer 1 can be a small laptop, a tablet with the expansion base or other electronic apparatuses with the clamshell display module, but not limited to the present embodiment.

As shown in FIG. 1 and FIG. 2, the portable computer 1 of the present invention includes a base 10, a display module 20, a support element 30, and a cam structure 40. Main computing components and related electronic components are disposed at the interior of the base 10. The base 10 comprises a front end 11, a rear end 12, and a front side and a rear side between the front end 11 and the rear end 12 of the base 10. The top of the base 10 is segmented into a first area 13 and a second area 14 between a front end 11 and a rear end 12; A first area 13 is defined at the front side and a second area 14 is defined at the rear side. The first area 13 is disposed with an input module 131, such as a keyboard, a touch panel, or the like. The base 10 further includes a recess portion 17, which is disposed in the rear end 12 or a position close to the rear end 12 relative to the cam structure 40, provided for receiving the cam structure 40.

The base 10 further includes two auxiliary sliding structures 15, which are between the front end 11 and the rear end 12 and disposed in two sides of the input module 131 to provide the functions of auxiliary positioning, buffering and anti-friction when the connecting end 21 of the display module 20 contacts with the base 10 to slip, in this embodiment, the auxiliary sliding structure 15 is a sheet structure attached or embedded on the surface of the base 10, and the auxiliary sliding structure has a smooth surface and magnetic property, such as a sheet combination of Teflon and iron, but the materials are not limited in this embodiment.

The display module 20 includes a connecting end 21, a display face 22, a support plane 23, and a free end 24. The display face 22 opposes to the support plane 23, and the connecting end 21 opposes to the free end 24. The display module 20 can have a display screen disposed at the display face 22 and supporting touch functions for receiving touch inputs from the user. The support plane 23 of the display module 20 includes a groove 231, so that the support element 30 is received when the display module 20 adjoins the support element 30.

The display module 20 further includes two auxiliary sliding elements 25 which are symmetrically disposed at two sides of the connecting end 21, and the position of each auxiliary sliding element 25 corresponds to each auxiliary sliding structure 15 of the base 10. In this embodiment, the auxiliary sliding element 25 is a magnetic element connected pivotally to the connecting end 21 so as to roll relative to the display module 20, such as a cylindrical or spherical magnet. The magnetic element adsorbs the auxiliary sliding structure 15 for corresponding positioning by magnetic force, and the magnetic element rolls along the auxiliary sliding structure 15 with the slid of the connecting end 21 of the display module 20 relative to the base 10. However, the structure of the magnetic element is not limited thereto.

The support element 30 includes a first fixed end 31 and a second fixed end 32. The first fixed end 31 can be pivotally connected to a portion of the display module 20 other than the display face 22. In this embodiment, the first fixed end 31 is pivotally connected to the support plane 23 of the display module 20 via hinges to form a rotatable pivot point, so that the display module 20 is able to rotate relative to the supporting element 30. The first fixed end 31 of the support element 30 is pivotally connected to a central part or nearly the central part of the support plane 23. A length of the support element 30 connected pivotally to the support plane 23 is not less than a length between the first fixed end 31 of the support element 30 and the connecting end 21 of the display module 20 as well as a length between the first fixed end 31 of the support element 30 and the free end 24 of the display module 20. Therefore, the support element 30 can be received in the groove 231 in the closed state of the portable computer or in the tablet operation state.

The cam structure 40 includes a first connecting portion 41 and a second connecting portion 42 protruding from one side of the first connecting portion 41. The first connecting portion 41 is connected pivotally to the second fixed end 32 of the support element 30 by hinges to form a rotatable pivot point and so that the support element 30 is able to rotate relative to the cam structure 40. The second connecting portion 42 is also connected pivotally to the rear end 12 of the base 10 by hinges to form another rotatable pivot point and so that the cam structure 40 is able to rotate relative to the base 10. In other words, by the design of two is parallel axes of the cam structure 40, the support element 30 is no longer directly pivoted on the rear end 12 of the base 10; the support element 30 is connected pivotally to the first connecting portion 41 of the cam structure 40 first and then connected pivotally to the rear end 12 of the base 10 by the second connecting portion 42 of the cam structure 40; therefore, the support element 30 is connected indirectly and pivotally to the base 10.

More specifically, in this embodiment, the portable computer 1 further includes at least one first pivot element 60 and at least one second pivot element 70. The base 10 and the second connecting portion 42 of the cam structure 40 are connected pivotally to each other by the at least one first pivot element 60. Each first pivot element 60 includes a bracket 61, a torsion spring 63, and a first shaft 62 with an auto lock function. The bracket 61 is fixedly disposed on the base 10. One end of the first shaft 62 is pivotally mounted on a bracket 61, and the other end of the first shaft 62 is fixed on the second connecting portion 42 of the cam structure 40, so that the second connecting portion 42 of the cam structure 40 is able to rotate relative to the bracket 61 by the first shaft 62.

The first shaft 62 includes a first convex piece 621 which is embedded in the second corresponding groove 421 of the second connecting portion 42 of the cam structure 40 to be fixed at the second connecting portion 42 of the cam structure 40. The first convex piece 621 has a first fixed hole 622 and an opening 623. The first fixed hole 622 allows fixed elements such as spigots or screws to pass through, so as to fix the first convex piece 621 in the second corresponding groove 421 of the second connecting portion 42. One end of the torsion spring 63 is fixed on the bracket 61 and the other end passes through and fixed to the opening 623. The torsion spring 63 provides elastic torque to assist the potential energy that the first connecting portion 41 of the cam structure 40 rotates normally towards the bottom of the base 10 by the second connecting portion 42 as a fulcrum (as shown in the counterclockwise direction in FIG. 2).

Each second pivot element 70 includes a fixing part 71 and a second shaft 72 with the auto lock function, and the fixing part 71 is fixed disposed on the second fixed end 32 of the support element 30. One end of the second shaft 72 is pivotally coupled to the fixing part 71 and the other end is fixed on the first connecting portion 41 of the cam structure 40, so that the second fixed end 32 of the support element 30 is able to rotate relative to the first connecting portion 41 of the cam structure 40 by the second shaft 72.

The second shaft 72 includes a second convex piece 721 which is embedded in the first corresponding groove 411 of the first connecting portion 41 of the cam structure 40 to be fixed at the first connecting portion 41 of the cam structure 40. The second convex piece 721 has a second fixed hole 722, allowing fixed elements such as spigots or screws to pass through, so as to fix the second convex piece 721 in the first corresponding groove 411 of the first connecting portion 41. Therefore, the support element 30 can rotate at proper angle by the second fixed end 32 at a fulcrum and keep fixing.

Please refer to FIG. 3(*a*) to FIG. 3(*e*). FIG. 3(*a*) illustrates a schematic diagram of the portable computer of the present invention in a closed state. FIG. 3(*b*) illustrates a schematic diagram of the display module rotated at right angles relative to the base of the portable computer of the present invention. FIG. 3(*c*) illustrates a schematic diagram of the portable computer of the present invention in a normal operating state. FIG. 3(*d*) illustrates a schematic diagram of the portable computer of the present invention in a tablet operating state. FIG. 3(*e*) illustrates a schematic diagram of the display module rotated towards the base of the portable computer of the present invention.

As shown in FIG. 3(*a*), in a closed state of the portable computer 1 of the present invention, the display module 20 overlaps on the base 10, and the display face 22 of the display module 20 faces the base 10. The support element 30 also overlaps on the display module 20, and connected pivotally to the display module 20 and the first connecting portion 41 of the cam structure 40 by the first fixed end 31 and the second fixed end 32 respectively. The second connecting portion 42 of the cam structure 40 is connected pivotally to the rear end 12 of the base 10. Due to the torque spring of the first pivot element (not shown, please refer to FIG. 2) is in a state of force bracing, the connecting end 21 of the display module 20 leans against the support element 30 to resist the elastic torque of the torsion spring 63 and so that the second fixed end 32 of the support element 30 and the first connecting portion 41 of the cam structure 40 are suspended in the accommodating portion 17; it means that the second fixed end 32 and the first connecting portion 41 keeps a distance from the recess portion 17 to be a steady state. In this embodiment, when the portable computer 1 is in the closed state, the connecting end 21 of the display module 20 and the second fixed end 32 of the support element 30 are in different axes which are substantially parallel, and the length of the support element 30 is larger than the length between the connecting end 21 of the display module 20 and the first fixed end 31 of the support element 30, but it is not limited thereto.

When the user applies force on the free end 24 of the display module 20 to open the display module 20 to let the portable computer leave the closed state, the connecting end 21 of the display module 20 does not move in the beginning, while the display module 20 rotates with the whole of the support element 30 and the cam structure 40 relative to the base 10 by the second connecting portion 42 as the fulcrum. In this process, since the length of the support element 30 is larger than that between the connecting end 21 of the display module 20 and the first fixed end 31 of the support element 30, the support element 30 is gradually away from the connecting end 21 of the display module 20. At this time, by the returning torsion provided by the torsion spring of the first pivot element (not shown) in the second connecting portion 42, the support element 30 which loses the support of the connecting end 21 will rotate and shift with the first connecting portion 41 of the cam structure 40 towards the bottom of the base 10 by the second connecting portion 42 as the fulcrum (as shown in the counterclockwise direction in FIG.). With increasing the flip angle of the display module 20 relative to the base 10, the first connecting portion 41 of the cam structure 40 is gradually close to the surface of the recess portion 17 until the first connecting portion 41 abuts the base 10 to be fixed, so that the cam structure 40 keeps a abutting position with the surface of the recess portion 17 of the base 10. At the time, the cam structure 40 is received in the recess portion 17 of the base 10, as shown in FIG. 3(*b*). Then the display module 20 and the support element 30 are able to rotate by the second fixed end 32 at the fulcrum.

When the display module 20 rotates continuously to a proper angle relative to the base 10, such as at an angle of approximate 75 degree, the display module 20 changes to rotate relative to the support element 30 by the first fixed end 31 of the support element 30 as the fulcrum. Simultaneously, the connecting end 21 of the display module 20 forms two slidable fulcrums at two sides of the connecting end 21 by the auxiliary sliding elements contacting with the auxiliary sliding structures of the base 10 (not shown, please refer to FIG. 1 and FIG. 2); with changing the position of the display module 20, the connecting end 21 moves from the second area 14 to the first area 13. When the display module 20 moves to the position shown in FIG. 3(*c*), the display module 20 is positioned by the auxiliary sliding element 25 of the display module 20 cooperating with a concave portion 151 of the auxiliary sliding structure 15 (shown in FIG. 1), and a support effect between the display is module 20 and the base 10 is provided by the support element 30. Therefore, the portable computer 1 of the present invention maintains in the operating status of the normal notebook. In this embodiment, the angle between the display module 20 and the base 10 is about 120 degrees or 135 degrees, so that the user can easily view or operate the display module 20. However, the present invention is not limited thereto.

When the user continuously applies force on the free end 24 of the display module 20 from the state of the portable computer 1 as shown in FIG. 3(c), the connecting end 21 of the display module 20 continuously moves towards the front end 11 of the base 10 by the first fixed end 31 of the support element 30 as a fulcrum. When the connecting end 21 approaches the position of the front end 11 of the base 10, the display module 20 is substantially horizontally stacked on the base 10, while the support plane 23 faces towards the base 10, and the support element 30 is positioned between the display module 20 and the base 10 and is received in the groove 231. At this time, the flip in 180 degrees of display module 20 is completed, as shown in FIG. 3(d), so that the portable computer 1 of the present invention is in the tablet operating state. During above operating process, the cam structure 40 is pressed continuously to keep the state of abutting the recess portion 17 of the base 10.

Figure 3A:
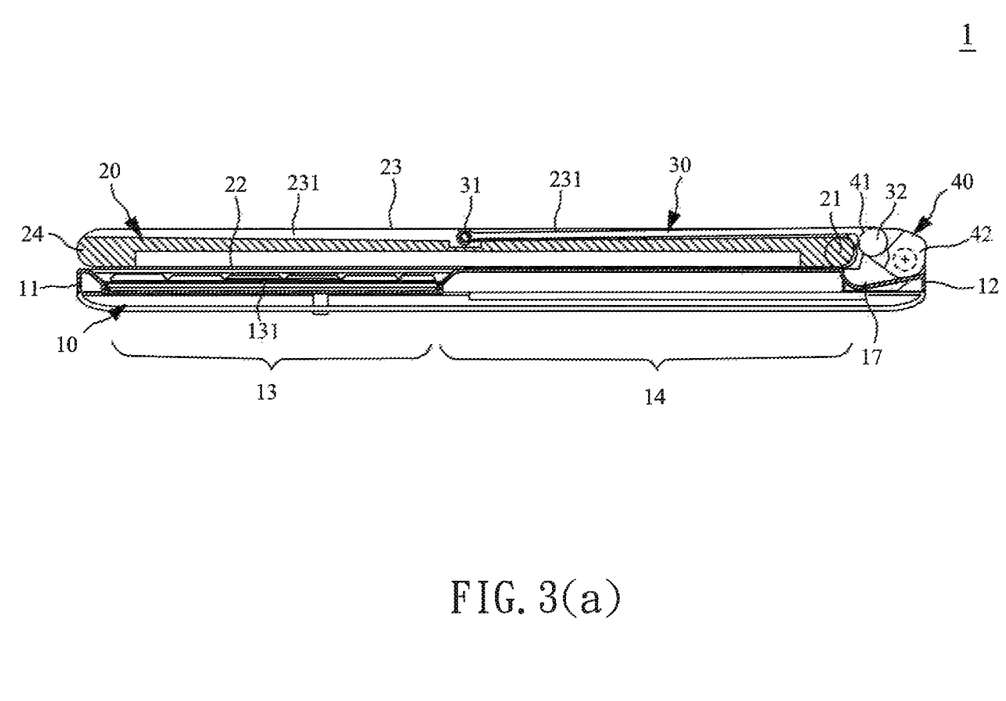
FIG. 3(a) illustrates a schematic diagram of the portable computer of the present invention in a closed state.
Figure 3B:
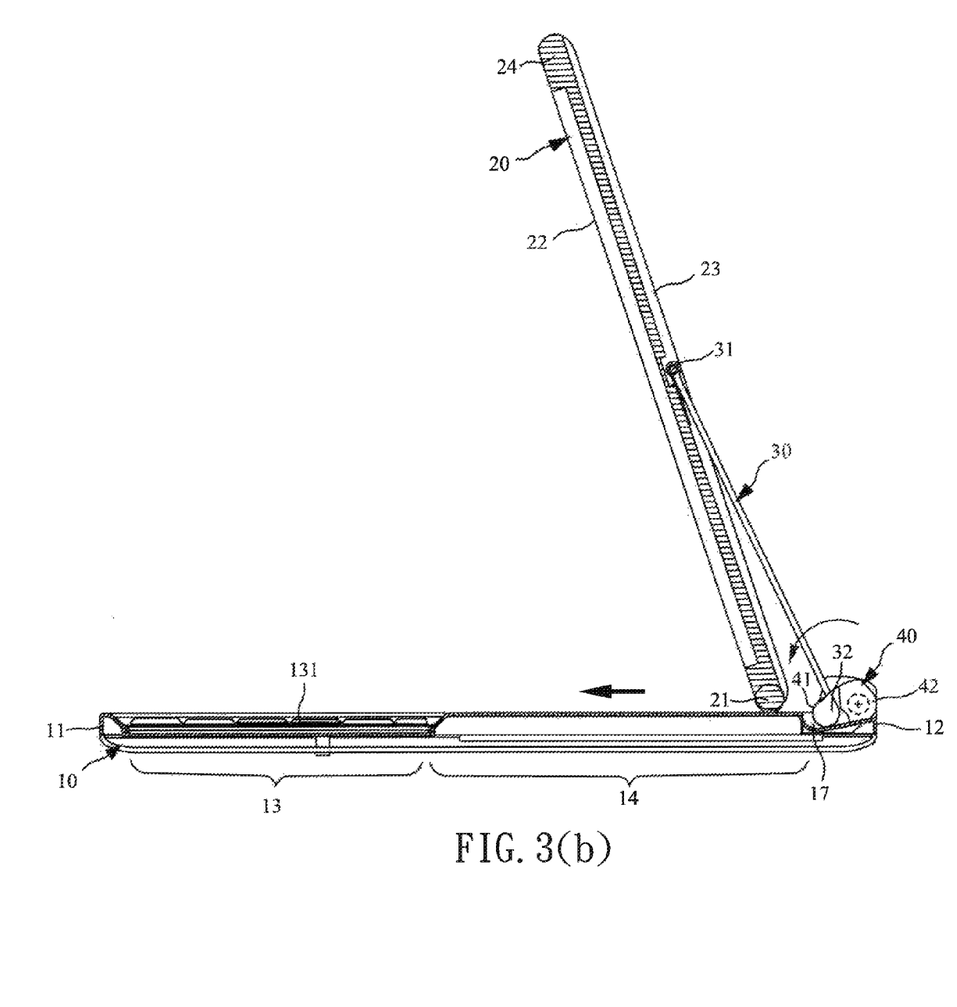
FIG. 3(b) illustrates a schematic diagram of the display module rotated at right angles relative to the base of the portable computer of the present invention.
Figure 3C:
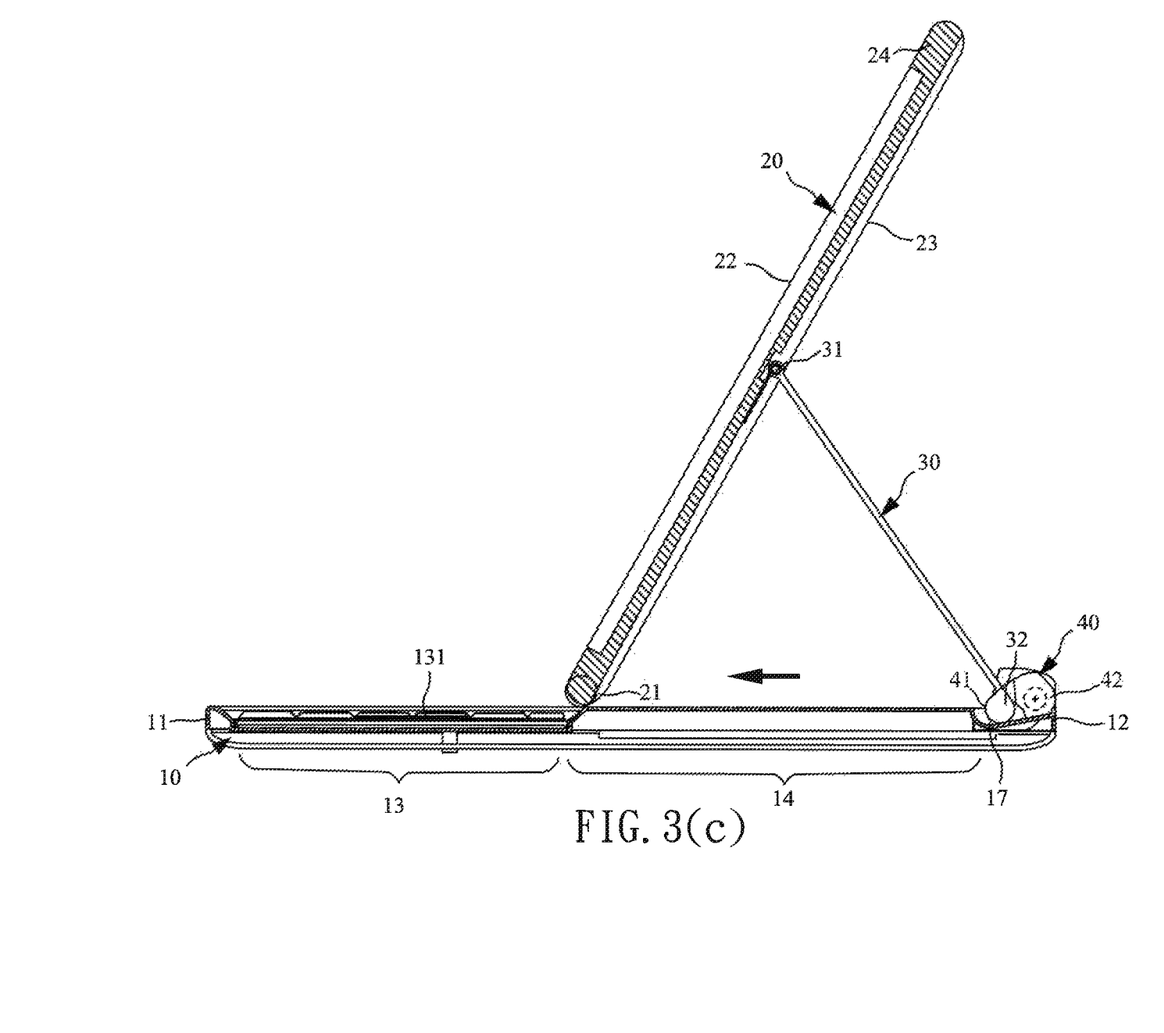
FIG. 3(c) illustrates a schematic diagram of the portable computer of the present invention in a normal operating state.
Figure 3D:
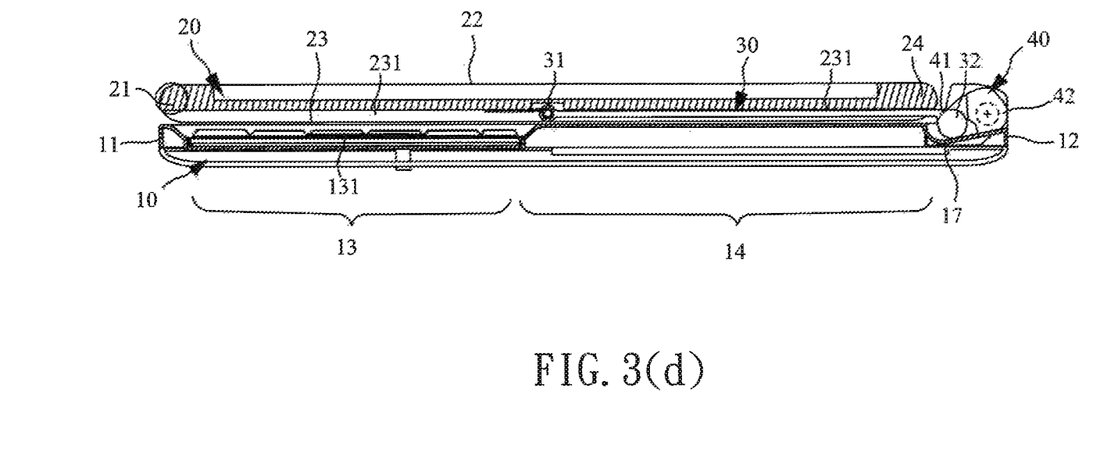
FIG. 3(d) illustrates a schematic diagram of the portable computer of the present invention in a tablet operating state in this invention.

In contrary when the user wants to return the portable compute 1 of the present invention from the state of FIG. 3(d) to the state of FIG. 3(c) or FIG. 3(a), he or she only needs to reversely apply force on the free end 24 of the display module 20, so that the display module 20 rotates by the first fixed end 31 of the support element 30 as a fulcrum. The connecting end 21 slides from the first area 13 to the second area 14 to directly return to the state shown in FIG. 3(c). When the connecting end 21 slides continuously towards the rear end 12 of the base 10 to the position shown in FIG. 3(b), the connecting end 21 of the display module 20 cannot move backwards due to the structure design, so the display module 20 changes to rotate with the support element 30 by the second fixed end 32 of the support element 30 as a fulcrum.

Figure 3E:
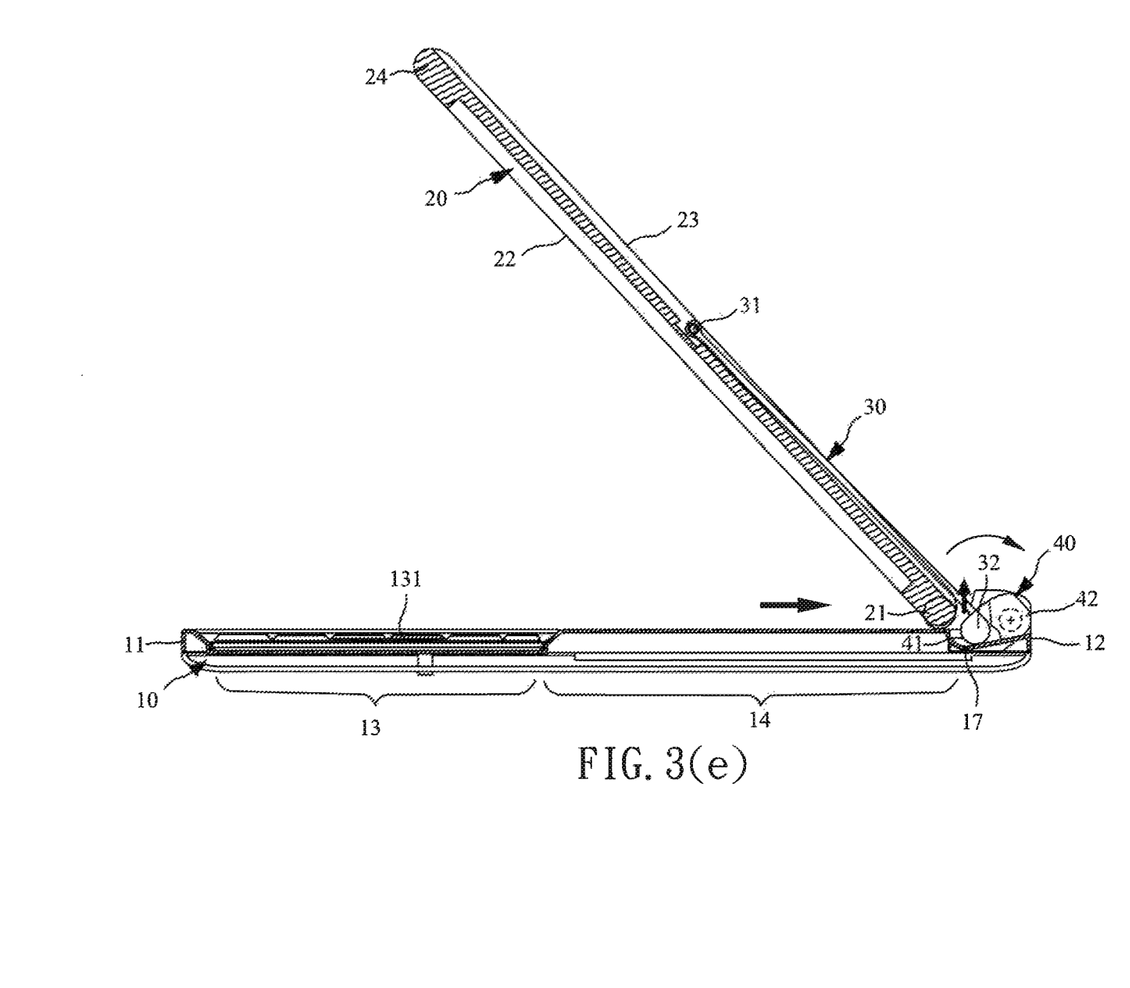
FIG. 3(e) illustrates a schematic diagram of the display module rotated towards the base of the portable computer of the present invention.

As shown in FIG. 3(e), in the process that the display module 20 and the support element 30 rotate towards the base 10, the connecting end 21 of the display module 20 starts to abut the support element 30 with the display module 20 approaching the base 10 more, so that the support element 30 is applied force upwards. Since the pivot point of the second fixed end 32 of the support element 30 and the first connecting portion 41 of the cam structure 40 is a movable pivot point, the cam structure 40 is forced to resist the elastic torque of the torsion spring of the first pivot element and rotates away from the base 10 by the second connecting portion 42 as a fulcrum (as shown in the clockwise direction); then the second fixed end 32 of the support element 30 and the first connecting portion 41 of the cam structure 40 are driven to suspend in the recess portion 17 and gradually returns to the corresponding position shown in FIG. 3(a). Therefore, the portable computer 1 of the present invention returns to the original closed state.

By the abovementioned structure design of the portable computer 1 of the present invention, whether the display face of the display module 20 faces to the base 10, such as the notebook state in FIG. 3(a), or the support plane of the display module 20 faces to the base 10, such as the tablet state in FIG. 3(d), the whole support element 30 can completely flat in the back of the display module 20. The pivot structure of the support element 30 connecting to the base 10 does not interfere other structures, and the flatness of the whole appearance of the portable computer 1 can be kept.

Figure 4:
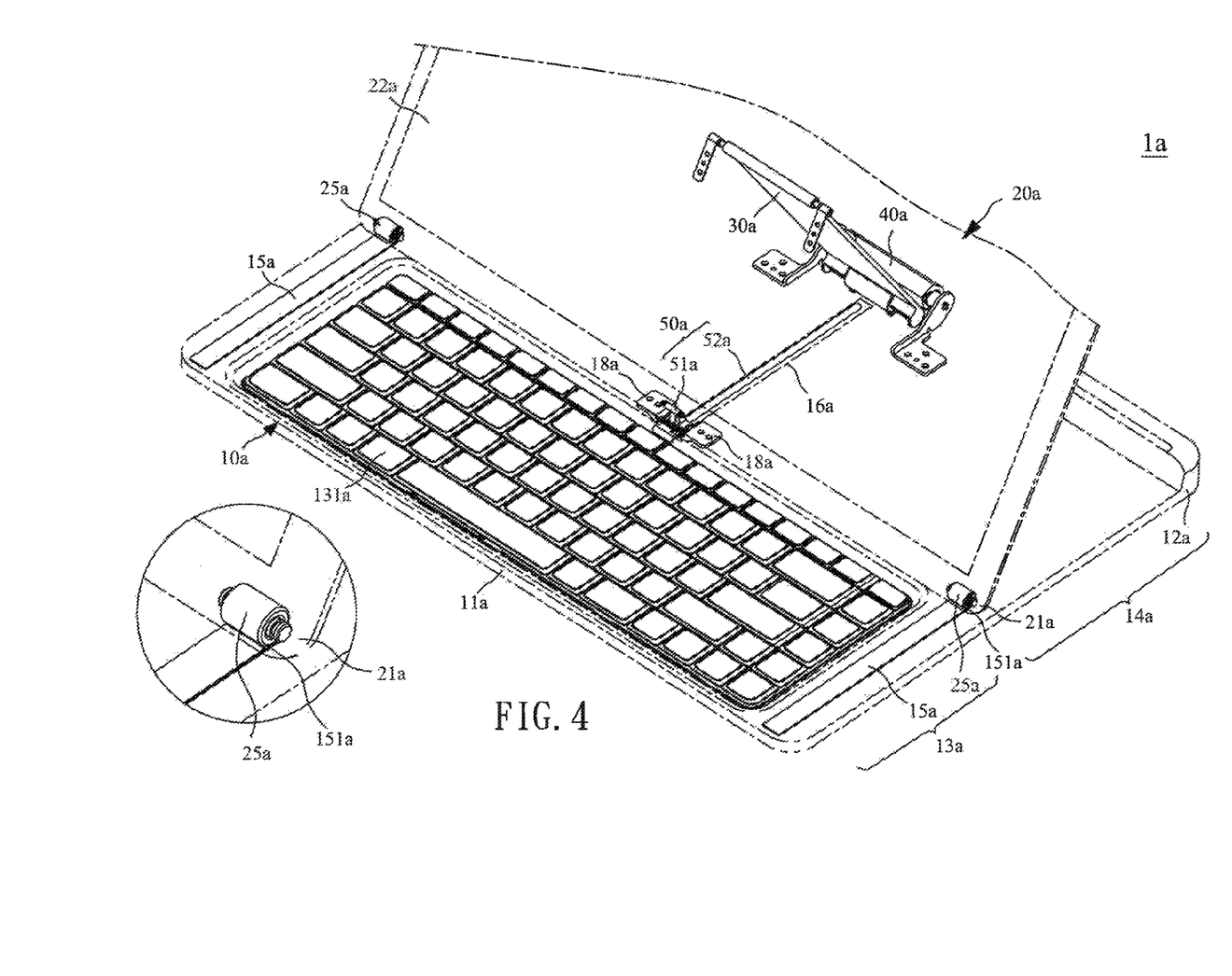
FIG. 4 illustrates a schematic diagram of a second embodiment of the portable computer of the present invention.

Please refer to FIG. 4. FIG. 4 illustrates a schematic diagram of a second embodiment of the portable computer of the present invention. This embodiment is a variation of the first embodiment. As shown in FIG. 4, in this embodiment, the portable computer 1a of the present invention includes a base 10a, a display module 20a, a support element 30a, a cam structure 40a and a sliding assembly 50a, and the sliding assembly 50a is disposed in the second area 14a of the base 10a. However, in other suitable embodiments, the sliding assembly 50a can also be extend forwardly to part of or all of the first area 13a. It should be noted that the sliding assembly 50a can also be disposed in the central part or near the central part of the second area 14a.

The sliding assembly 50a includes a sliding element 51a and a sliding guide structure 52a. The sliding guide structure 52a is fixedly disposed at least in the second area 14a of the base 10a. The sliding element 51a provides the slip function and the combination function for the connecting end 21a of the display module 20a, so that the sliding is element 51a can slide along the sliding guide structure 52a relative to the base 10a in the second area 14a of the base 10a. The central part of the surface of the second area 14a of the base 10a having a slit 16a. The sliding guide structure 52a is disposed below the surface of the second area 14a corresponding to the position of the slit 16a. By different design requirements, the sliding guide structure 52a can also be extend from the second area 14a to the first area 13a, so that the slit 16a is at the surface of the second area 14a and part of or all of the first area 13a. The base 10a further comprises a positioning structure 18a, which is disposed in the second area 14a and close to the position of the first area 13a to provide a positioning effect of the display module 20a with the sliding element 51a.

In this embodiment, the sliding guide structure 52a is a rod element and the sliding element 51a is a sleeve element combining with and sliding along the rod element; however, the present invention is not limited thereto. For example, the sliding guide structure 52a can be replaced for a rail and the sliding element 51a can be replaced for a sliding block in the rail and sliding along the rail.

The central part of the connecting end 21a of the display module 20a is connected pivotally to the sliding element 51a by hinges or perforation element to form a rotatable pivot joint, so that the display module 20a is able to rotate relative to the sliding element 51a.

Figure 5A:
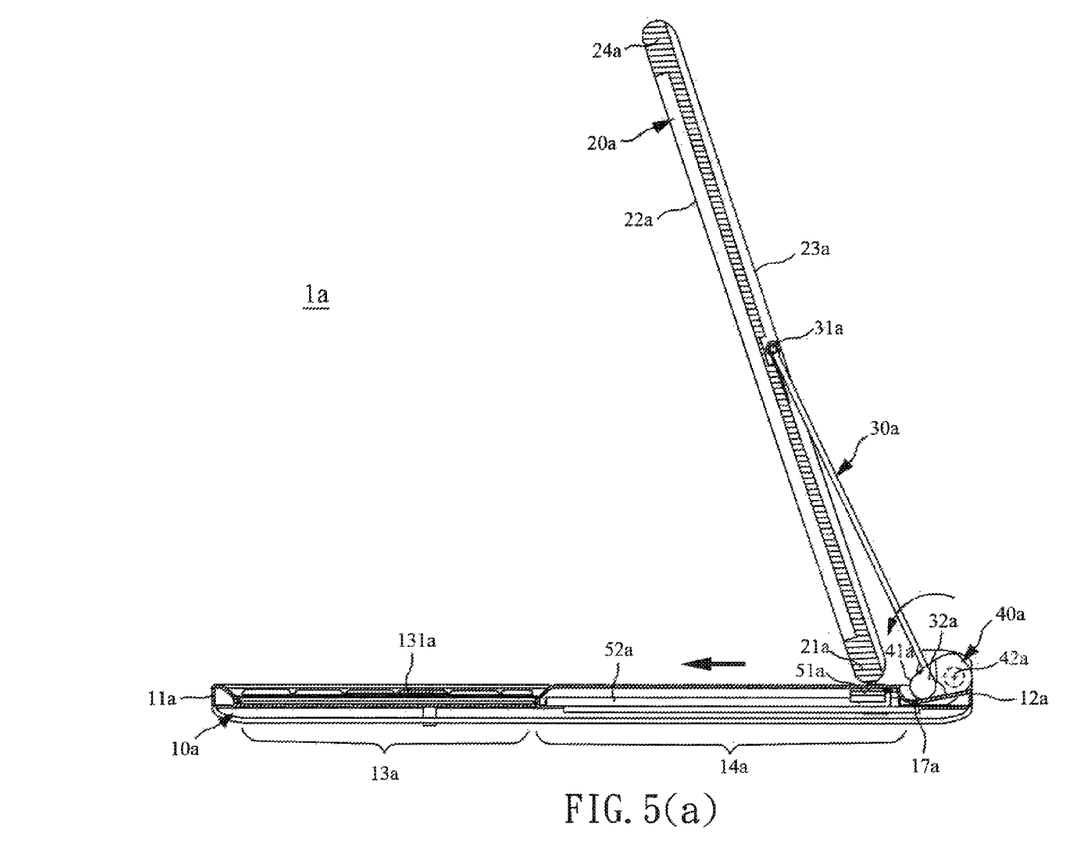
FIG. 5(a) illustrates a schematic diagram of the display module rotated at right angles relative to the base of the portable computer of the present invention.
Figure 5B:
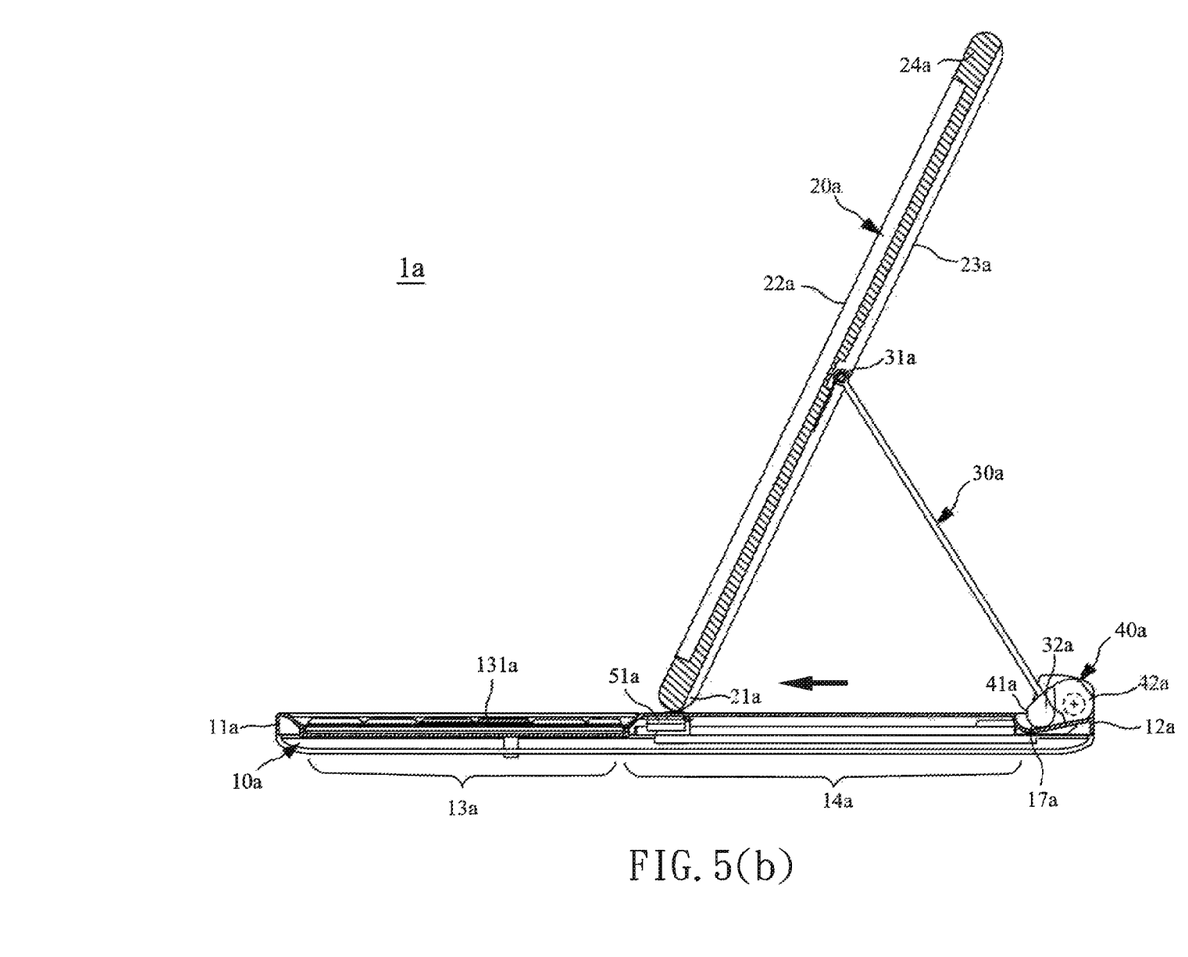
FIG. 5(b) illustrates a schematic diagram of the portable computer of the present invention in the normal operating state.

Please refer to FIG. 5(a) and FIG. 5(b). FIG. 5(a) illustrates a schematic diagram of the display module 20a rotated at right angles relative to the base 10a of the portable computer 1a of the present invention. FIG. 5(b) illustrates a schematic diagram of the normal operating state of the portable computer 1a of the present invention.

As the abovementioned embodiment, when the user applies force on free end 24a of the display module 20a to make the display module 20a away from the closed state, the connecting end 21a of the display module 20a keeps fixed first. As shown in FIG. 5(a), until the display module 20a continuously flips to the abovementioned proper angle relative to the base 10a (e.g. an angle of 120 degrees or 135 degrees), the support element 30a rotates and shifts towards the bottom of the base 10a with the cam structure 40a by the second connecting portion 42a as the fulcrum. After the first connecting portion 41a of the cam structure 40a falls in the recess portion 17a and abuts against the surface of the recess portion 17a, the display module 20a and the support element 30a rotate by the second fixed end 32a as a fulcrum, and the connecting end 21a slides along the sliding guide structure 52a from the second area 14 to the first area 13 by the sliding element 51a.

When the display module 20a moves to the position shown in FIG. 5(b), the portable computer 1 of the present invention keeps the notebook operating state by the positioning effect produced by the sliding element 51a cooperating with the positioning structure 18a of the base 10a as shown in FIG. 4, or by the auxiliary sliding element of the display module 20a as shown in FIG. 4 cooperating with the concave portion 151a of the auxiliary sliding structure of the base 10a; however, the present invention is not limited thereto.

In this embodiment, due to the limitation of the length of the sliding guide structure 52a, the sliding element 51a cannot slip towards the first area 13; at this time, by separating the sliding element 51a from the connecting end 21a of the display module 20a, the display module 20a can continuously rotate and slip by the first fixed end 31a as a fulcrum, so that the display module 20a overlaps the base 10a finally; the portable computer 1 is changed to the tablet operating state. In addition to the foregoing embodiment, the sliding guide structure 52a can be extended to the first area 13a. With the separating design of the input device 131a or the usage of two sliding assemblies respectively disposed on two sides of the base 10a, the sliding element 51a assemblies will not be interfered by other components and the display module 20a can be smoothly driven until the display module 20a being stacked on the base 10a; however, the present invention is not limited thereto.

For the changes between the tablet operating state and the closed state of the portable computer 1a in this embodiment, the corresponding actuation of the display module 20a and other components are similar to the abovementioned first embodiment, so it will not be described herein.

Therefore, the display module of the portable computer of the present invention can be directly flipped to change different states of operation. By the cam structure cooperating with the support element, the display module is not interfered by other structures during the process of flip and substantially horizontally stacked on the base. At the same time, the cam structure provides auto lock function for the display module rotating to a certain position, so that the invention improves the convenience of the operation, and the display module presents structural stability under different operating states.

It is noted that the above-mentioned embodiments are only for illustration. It is intended that the present invention cover modifications and variations of this invention provided they fall within the scope of the following claims and their equivalents. Therefore, it will be apparent to those skilled in the art that various modifications and variations can be made to the structure of the present invention without departing from the scope or spirit of the invention.

What is claimed is:

1. A portable computer, including:
   a base, with a front side and a rear side a front end and a read end thereof, having a first area defined at the front side and a second area defined at the rear side;
   a display module, including a connecting end, a free end relative to the connecting end, a display face, and a support plane relative to the display face;
   a support element, including a first fixed end and a second fixed end, the first fixed end being connected pivotally to a portion of the display module other than the display face so that the display module is able to rotate relative to the support element;
   a cam structure, including a first connecting portion and a second connecting portion, the first connecting portion being connected pivotally to the second fixed end so that the support element is able to rotate relative to the cam structure; the second connecting portion being connected pivotally to the rear end of the base or close to the rear end so that the cam structure is able to rotate relative to the base; accordingly, the support element is connected indirectly and pivotally to the base; and
   a torsion spring, disposed between the second connecting portion of the cam structure and the base, for providing elastic torque to assist the potential energy that the first connecting portion of the cam structure rotates normally towards the base;
   whereby, when the portable computer is in a closed state, the connecting end of the display module leans against the support element to resist the elastic torque of the torsion spring; when the portable computer the display module rotates relative to the base in an open state, the support element loses the support of the connecting end and the first connecting portion of the cam structure rotates towards a bottom the base by the elastic torque provided by the torsion spring.

2. The portable computer as claimed in claim 1, further comprises at least one first pivot element, and the base and the second connecting portion of the cam structure are pivotally connected to each other by the at least one first pivot element.

3. The portable computer as claimed in claim 2, wherein each first pivot element includes a bracket and a first shaft, and the bracket being fixedly disposed on the base; one end of the first shaft is pivotally mounted on a bracket, and the other end of the first shaft is fixed on the second connecting portion of the cam structure, so that the second connecting portion of the cam structure is able to rotate relative to the bracket by the first shaft.

4. The portable computer as claimed in claim 3, wherein at least one of the first shaft includes a convex piece, and the first shaft is fixed by the convex piece to the second connecting portion of the cam structure; one end of the torsion spring is fixed on the bracket and the other end is fixed on the convex piece.

5. The portable computer as claimed in claim 4, further includes at least one second pivot element, and the second fixed end of the support element is connected pivotally to the first connecting portion of the cam structure by the each second pivot; wherein each second pivot element includes a fixing part and a second shaft, and the fixing part is fixed on the second fixed end of the support element; the second shaft further includes a second convex piece fixed on the first connecting portion of the cam structure by the second convex, and the second shaft pivotally combines the fixing part, so that the second fixed end of the support element is able to rotate by the second shaft relative to the first connecting portion of the cam structure.

6. The portable computer as claimed in claim 1, wherein an input module is disposed in the first area.

7. The portable computer as claimed in claim 1, wherein the support plane of the display module includes a groove for receiving the support element when the display module adjoins the support element.

8. The portable computer as claimed in claim 7, wherein the groove extends from the free end to the connecting end.

9. The portable computer as claimed in claim 1, further includes at least one sliding assembly, and each sliding assembly including a sliding element and a sliding guide structure; the sliding guide structure is disposed at least in the second area of the base; the sliding element is combined with the connecting end of the display module and slides along the sliding guide structure.

10. The portable computer as claimed in claim 9, wherein the base further includes a surface having at least one slit; the sliding guide structure is disposed below the surface corresponding to the slit, and the sliding element passes through the slit and protrudes out of the surface; a width of the slit is less than that of the sliding element, and the width of the slit is not less than that of the connecting portion.

11. The portable computer as claimed in claim 10, wherein the surface having the slit is in the second area, and the sliding guide structure is disposed correspondingly below the surface of the second area corresponding to the slit.

12. The portable computer as claimed in claim 10, wherein the surface having the slit includes the second area and at least part of or all of the first area; and the sliding guide structure is disposed correspondingly below the surface including the second area and at least part of or all of the first area surface corresponding to the slit.

13. The portable computer as claimed in claim 1, wherein the rear end of the base or a position closed to the rear end of the base further includes an recess portion for receiving the cam structure.

14. The portable computer as claimed in claim 13, wherein when the display face of the display module faces the base and overlaps the base, the connecting end of the display module blocks the support element, so that the second fixed end of the support element and the first connecting portion of the cam structure are suspended in the recess portion and keep a spacing from the base.

15. The portable computer as claimed in claim 14, wherein when the support plane of the display module faces and overlaps the base, or during a process that the display module flips and opens relative to the base, the cam structure falls in the recess portion of the base, and the second fixed end of the support element and the first connecting portion of the cam structure abut on a bottom surface of the recess portion.

16. The portable computer as claimed in claim 1, wherein a length of the support element is not less than a length between the first fixed end of the support element and the free end of the display module as well as a length between the first fixed end of the support element and the connecting end of the display module.

17. The portable computer as claimed in claim 1, wherein the first fixed end of the support element is disposed at a central part or nearly the central part of the support plane.

18. The portable computer as claimed in claim 1, wherein the display module further comprises two auxiliary sliding elements, symmetrically disposed at two sides of the connecting end; the base further includes two auxiliary sliding structures corresponding to the two auxiliary sliding elements, symmetrically disposed at two sides of the input module.

19. The portable computer as claimed in claim 18, wherein each auxiliary sliding element is a rollable magnetic element, and each auxiliary sliding structure is a sheet structure has a smooth surface and magnetic property.

20. The portable computer as claimed in claim 1, wherein when the display module overlaps with the base in a closed state, the connecting end of the display module and the second fixed end of the support element are on different axes which are substantially parallel.

* * * * *